Feb. 2, 1937. W. A. EATON 2,069,578
ELECTRIC BRAKE
Filed April 20, 1932 2 Sheets-Sheet 1

INVENTOR.
Wilfred A. Eaton,
BY
ATTORNEY

Feb. 2, 1937. W. A. EATON 2,069,578
ELECTRIC BRAKE
Filed April 20, 1932 2 Sheets-Sheet 2

INVENTOR.
Wilfred A. Eaton,
BY
ATTORNEY

Patented Feb. 2, 1937

2,069,578

UNITED STATES PATENT OFFICE 2,069,578

ELECTRIC BRAKE

Wilfred A. Eaton, Pittsburgh, Pa., assignor to Bendix Westinghouse Automotive Air Brake Company, Pittsburgh, Pa., a corporation of Delaware Application April 20, 1932, Serial No. 606,484

10 Claims. (Cl. 188—152)

The present invention relates to brakes and more particularly to a fluid pressure and electrical system for the operation of the brakes of a vehicle.

An object of the present invention is to provide a braking system for vehicles in which the brakes will be operated by hydraulic means, the pressure for said hydraulic means being supplied by electrical means under the control of the operator.

Another object of the invention is to provide a braking system including electrical means, operable at the will of the operator for applying pressure to an hydraulic system, the pressure in which effects application of the brakes.

Another object of the present invention is to provide an hydraulic and electrical braking system in which the brakes are maintained at any desired degree of application by means operated automatically but always under the control of the operator.

A further object is to provide an hydraulic and electrical braking system including a novel valve device which is self-lapping at the will of the operator for maintaining the brakes at any desired degree of application.

A still further object is to provide an hydraulic and electrical braking system in which a discontinuation of the application of positive pressure to the brake pedal will cause self-lapping operation of parts of the system, whereby the brakes will be automatically maintained in applied condition by hydraulic pressure in the system.

Other objects and features of novelty will appear more clearly from the following detailed description taken in connection with the accompanying drawings, which illustrate one embodiment of the invention. It is to be expressly understood, however, that the drawings are for purposes of illustration only and are not designed as a definition of the limits of the invention, reference being had for this purpose to the appended claims.

Referring to the drawings.

Figure 2:
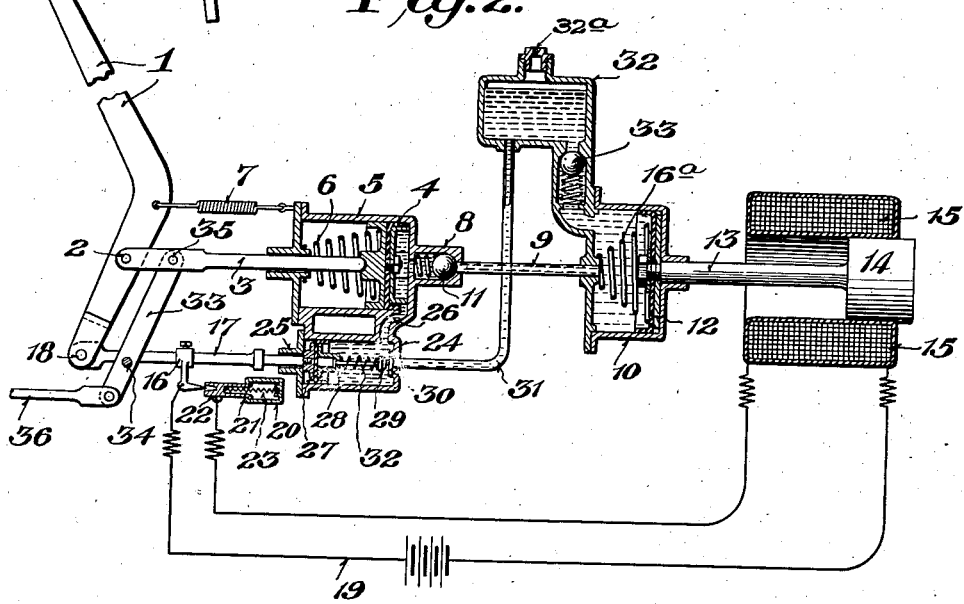
Fig. 2 is a view, partly in section, showing the principal parts of the braking system in operative relation.

Referring to the drawings, and more particularly to Fig. 2 thereof, it will be seen that a foot pedal 1 has been provided, such pedal having no fixed pivot. Pivotally connected to pedal 1 at point 2 is one end of a push-rod 3, the same being attached at its other end to a piston 4 which is slidable in a cylinder 5 and normally maintained at one end of said cylinder by a spring 6, disposed between one end of said cylinder and said piston. The spring 6 normally urges the piston 4, push-rod 3 and pedal 1 to such a position as to maintain these parts in their inoperative or retracted position. An additional retracting spring 7 may be provided, the same being shown as being disposed between the pedal 1 and the cylinder 5. Formed on the end of the cylinder 5 at which the piston 4 remains in its inoperative or retracted position, and extending externally thereof is a cylindrical extension 8, the interior of the same being open at one end to the cylinder 5 in front of piston 4 and at its other end to a pipe or tube 9 which is in constant, open communication with a cylinder 10. A spring-pressed ball-check valve 11 is disposed within the cylindrical extension 8 and prevents any flow of fluid from cylinder 5 to cylinder 10, although allowing flow in the opposite direction.

Means are provided for forcing fluid, which may comprise any suitable liquid from cylinder 10 through tube 9 into cylinder 5 to thereby move piston 4 to the left as viewed in Fig. 2, such means comprising a piston 12, disposed in cylinder 10 and attached by means of a rod 13 to the armature 14 of a solenoid, the windings of which are designated by the numeral 15. A spring 16ᵃ is provided within cylinder 10 and bears against one end of said cylinder and against piston 12, thereby maintaining said piston and the armature 14 in inoperative or retracted position.

Means are provided for controlling, at the will of the operator, the energization or deenergization of the solenoid windings 15. Such means include a switch member 16 carried by a rod 17 which is pivotally connected at one end to the pedal 1 at the point 18 and at its other end is journaled in a tubular extension 25 formed on one end of a cylinder 24 for sliding movement therethrough. The switch member 16 is therefore movable with pedal 1 and is connected in the circuit 19 of the solenoid windings. A fixed switch member is also provided, such member comprising a fixed tubular member 20 being closed at one end and open at its other end, said open end being formed with an inturned marginal flange 21. A tubular contact member 22 is slidably disposed within member 20 and is provided at one of its ends with an outturned annular flange which abuts the interior portion of the inturned flange 21 to thereby prevent the member 22 from being withdrawn from the member 20 when the two elements are in fully extended position. A spring 23 normally urges members 20 and 22 apart to their fully extended position.

Means are provided for causing the braking system to be lapped at any desired degree of application, such means including the cylinder 24 which is shown as being formed integrally with cylinder 5, although such construction is not required as the two cylinders may be formed entirely separately if desired. Cylinder 24 is closed at one end by the cover or extension 25 in which the rod 17 has a slidable fit, said rod extending through the cover and, when the pedal 1 is in completely retracted position, having one end flush with the inner wall of cover 25. Cylinder 24 is in communication with cylinder 5 through a passage 26 which connects adjacent ends of such cylinders. Disposed within cylinder 24 is a piston 27 which is normally maintained against the end of the cylinder through which rod 17 extends, it being held in this position by means which will appear hereinafter. Piston 27 is formed, on its inner face, with a tubular extension 28, one end of which is formed with an opening through which a headed valve rod passes, the head of said rod being slidable within the tubular member 28, and held therein by the cover on said member. Formed on the other end of the valve rod is a valve member 29 which is normally maintained away from, but may seat on, a valve seat 30 formed in the end of the cylinder and communicating with a pipe 31. A spring 32, coiled about the valve rod and bearing at its ends against the tubular member 28 and the valve member 29, maintains said valve rod and valve member at their fully extended position, in which valve member 29 is adjacent but not seated on the seat 30. It will be apparent that movement of piston 27 to the right in Fig. 2 will effect the seating of valve 29 on seat 30. Pipe 31, referred to above, communicates at one end with cylinder 24 through valve seat 30 and at its other end is in constant communication with a reservoir 32. Reservoir 32 also communicates with cylinder 10 past a spring-pressed ball-check valve 33 which allows passage of fluid from reservoir 32 to cylinder 10 but not in the opposite direction. As shown in Fig. 2 a vent 32ª may be formed in reservoir 32, although such is not requisite to the proper operation of the system.

Means are provided for effecting the operation of the brakes by the structure described hereinbefore, such means comprising a lever 33, mounted on a fixed pivot 34 and pivotally connected at its upper end to rod 3 at point 35. At its lower end lever 33 is pivotally connected to a brake-rod 36.

Figure 1:
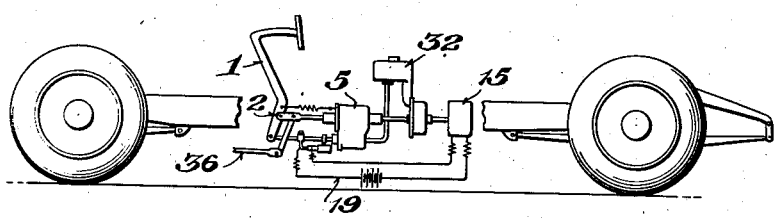
Fig. 1 is a view showing the disposition of the braking system on an automobile chassis.
Figure 3:
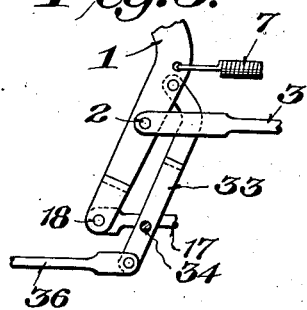
Fig. 3 is a detailed view of a modified arrangement of the connections of certain elements of the invention.

If desired, instead of the connection shown in Fig. 1, lever 33 may be connected at its upper end to pedal 1 as shown in Fig. 3. It will be obvious that this construction will result in greater pedal pressure, the foot supplying a larger proportion of the braking power than in the construction in Fig. 2.

In operation, pressure to the left, as viewed in Fig. 2, on foot pedal 1 causes said pedal to rock about pivot 2 so that rod 17 moves to the right, first forcing valve 29 against its seat 30, and upon further movement to the right, closing the switch contacts 16 and 22. The solenoid coils 15 will now be energized and armature 14 will be moved to the left, moving piston 12 to the left in cylinder 10 and forcing liquid from cylinder 10, through pipe 9, into cylinder 5 past check valve 11, where it exerts a force on piston 4. Liquid will also be forced from cylinder 5 through passage 26 into cylinder 24 where it will exert a force on piston 27 to the left in Fig. 2. It will be observed that piston 27 has already been moved to the right by rod 17, the first part of said movement causing closure of valve 29, and subsequent movement causing sliding of the valve rod head in tubular extension 28 and compression of spring 32, whereby valve 29 is maintained seated. The liquid pressure acting to the left on piston 27' will not of course unseat valve 29, as piston 27 will be maintained in its position by foot-pressure exerted through rod 17.

With the parts in the positions above described, lever 1 will, in effect, be a beam acted on to the left by the foot, piston 4 and piston 27, the sum of the three forces being transmitted to the brake lever 33 at point 35, to thereby rock lever 33 about point 34 and apply the brakes. During brake operation, the lever 1 pivots about the foot of the operator in a clockwise direction, due to the forces exerted by the pistons 4 and 27. It will be understood that the return spring 7 tends to hold the pedal pad of the lever 1 against the foot of the operator under conditions of brake actuation. If the foot pedal is now held stationary at a point representing any given degree of brake application, current will continue to flow through magnet 17 until the hydraulic pressure in cylinders 5 and 24 has built up sufficiently to swing pedal lever 1 to the left about the pedal pad as a fulcrum. When this occurs, rod 17 will also move to the left and move switch contact 16 away from contact 22, thereby de-energizing the solenoid coils 15. It will be observed that prior movement of rod 17 to the right in Fig. 2 results in lost motion between tubular extension 28 and the valve rod, and consequently when piston 27 moves to the left in Fig. 2 under pressure of the fluid, when further foot-pressure on pedal 1 is stopped, valve 29 will not be unseated. Fluid under pressure will therefore be sealed in cylinders 5 and 24 by check valve 11 and valve 29. It will be apparent that the brakes have thus been applied to a desired degree, and maintained at this degree of application by what might be termed an hydraulic ratchet. If it is now desired to release the brakes, foot-pressure on pedal 1 is released and since such foot-pressure was balanced by the force exerted on the pedal by piston 27 through rod 17, lever 1 will rock about point 2 in a clockwise direction, and rod 17 and piston 27 will move to the left in Fig. 2 until the tubular extension 28 moves valve 29 from seat 30 by engaging the head on the valve rod. Liquid will now be released from cylinder 5, through passage 26, cylinder 24, pipe 31, reservoir 32, past check valve 33 to cylinder 10. Springs 6 and 16ª will aid spring 7 in returning the parts to their inoperative positions and the brakes to released position.

Figure 4:
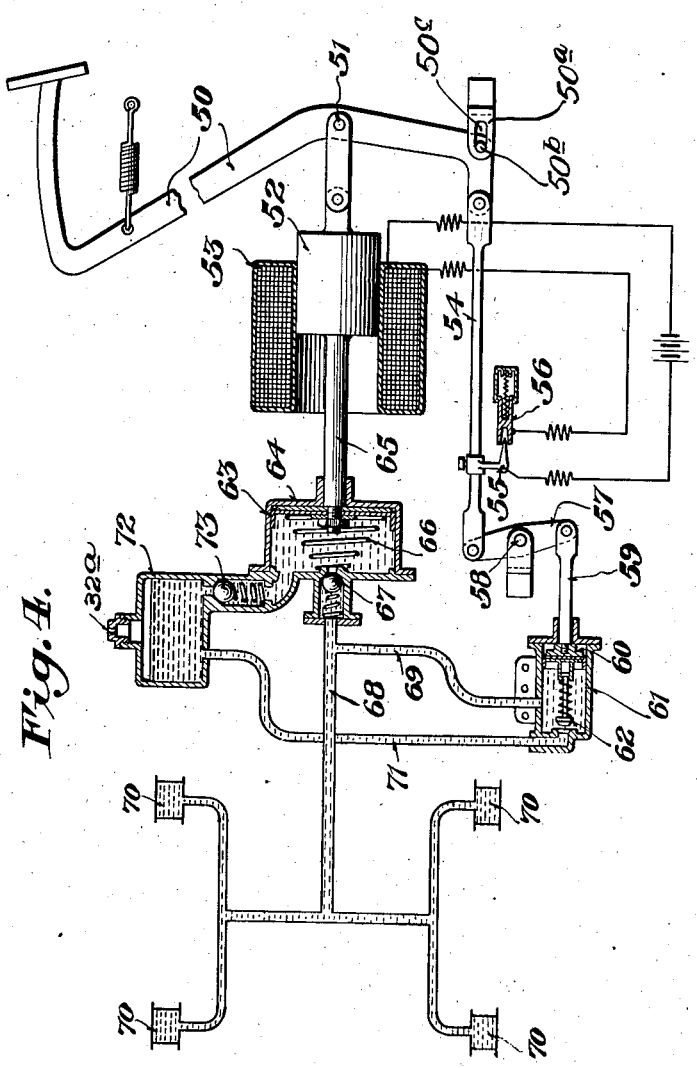
Fig. 4 is a view, partly in section, of an hydraulic and electrical braking system in which the brakes are adapted to be applied by hydraulic means.

Referring to the braking system disclosed in Fig. 4 it will be seen that the same adapts the principle of the system disclosed in Fig. 2 to a braking system in which the brakes are to be operated hydraulically. In this structure foot-pressure on the brake pedal 50 causes the same to rock in a counterclockwise direction about the point 51 at which the armature 52 of a solenoid 53 is pivotally attached to the brake pedal. As shown, the lower end of the pedal has a suitable lost motion connection with a stationary bracket 50a, such connection including a pin 50b cooperating in a slot 50c in said bracket, such construction permitting the above described pivotal movement of the brake pedal. Rod 54, attached to the lower end of pedal 50, is moved to the right by such pedal movement, thereby causing lever 57 to rock about its fixed pivot 58, and move rod 59 attached to the lower end of lever 57, to the left in Fig. 4. Such movement of rod 59 exerts a force on piston 60 in cylinder 61 effecting closure of valve 62. Subsequent movement of pedal 50 causes switch member 55, carried by rod 54, to contact fixed switch member 56, thereby energizing solenoid coils 53 and moving solenoid armature 52 to the left in Fig. 4. Piston 63 in cylinder 64 is rigidly connected to armature 52 by connecting rod 65 and is moved to the left with said armature against the force of spring 66, thereby forcing liquid under pressure past ball-check valve 67 and through pipes 68 and 69. Fluid forced through pipe 68 is transmitted through suitable passages to hydraulic brake-operating cylinders 70 for operating the vehicle brakes. Fluid forced through pipe 69 is conducted to cylinder 61 and exerts a pressure on piston 60 in a direction opposite to the pressure thereon caused by foot-pressure on pedal 50. Any cessation of such foot-pressure will result in a continued movement of piston 63 until sufficient pressure has been built up in cylinder 61 to move piston 60 to the right, thereby causing a leftward movement of rod 54 to open the switch contacts 55, 56 thereby de-energizing coils 53. If, now, foot-pressure is released from pedal 50, pressure exerted by rod 59 will be removed from piston 60, which will therefore move to the right, opening valve 62 and allowing fluid under pressure to flow from cylinder 64 and brake cylinders 70 through pipe 69, cylinder 61, pipe 71, reservoir 72, past ball-check valve 73 and into cylinder 64, thereby causing release of the brakes. It will be apparent that the structure just described includes the hydraulic ratchet or self-lapping feature which was described hereinbefore.

While there have been illustrated and described two embodiments of the present invention, it is to be understood that the same might be embodied in various forms, and that changes in the design of the system or parts thereof may be made without departing from the spirit of the invention. Reference will therefore be had to the appended claims for a definition of the limits of the invention.

What is claimed is:

1. In a system for operating vehicle brakes, a brake pedal, braking connections associated therewith, fluid-operated means for moving said connections by power, motive means for supplying fluid under pressure to said first named means, electrical means controlled by said pedal for operating said motive means, and means operable when said brake pedal has been depressed to any selected position for interrupting operation of said motive means and for holding said brakes applied.

2. In a braking system, a manually-operated part for closing an electric circuit, a fluid-operated piston for applying the brakes by power, a second piston moved on energization of said circuit for applying pressure to said first piston, means operable by said first piston for applying said brakes and exerting a force on said manually-operated part, and a third piston operated by pressure exerted by said second piston for controlling said electric circuit.

3. In a braking system, manually-operable means, an hydraulically-operated device, common means connecting said device and said manually-operable means to the brakes, and a second hydraulically-operated device operably-connected to said brakes through said manually-operable device.

4. In a braking system, a manually-operable means, a fluid motor operable in one direction for operating the brakes, a fluid operated device movable in one direction with said manually-operable means, and in the opposite direction by a pressure differential applied to said motor to move the latter in said one direction.

5. In a braking system, a manually-operated member, an hydraulic actuator therefor, an electrical device for operating said hydraulic actuator, switch means operated by said manually-operated member for controlling said electrical device, and means including a valve device, manually-operable for closing said switch means to operate said device and actuator to apply the brakes, and to interrupt said switch means and hold the brakes applied.

6. In a braking system, an hydraulic actuator, a switch-controlled electrical device for operating said hydraulic actuator, and means for controlling the operation of said hydraulic-actuator, said means comprising a cylinder, a piston slidable therein, a manually-controlled rod abutting said piston, a valve means carried by said piston and having a lost-motion connection therewith, and connections between said cylinder and said hydraulic actuator.

7. In a braking system, a manually-operated member, braking connections associated therewith, an hydraulic actuator connected with said member, electrical means for causing operation of said actuator, a piston device movable in one direction by said manually-operated member, valve means carried by said piston device, and means for moving said piston device in an opposite direction when the brakes are applied to a selected extent for rendering said electrical means inoperative and for maintaining said brakes applied to said extent.

8. In a braking device, a normally open hydraulic system, a device adapted to be operated by fluid in said system, electrical means for causing operation of said device, a valve in said system for controlling the operation of said device, switch means for said electrical means, said valve means and said switch being simultaneously manually movable in one direction and separately movable in the other direction, said last named movement effecting movement of said switch prior to movement of said valve means.

9. A fluid-pressure braking system comprising a brake pedal, brake-operating connections associated with said pedal, a fluid-pressure actuator connected with said pedal for applying the brakes by power, means for controlling said actuator comprising an electrical solenoid, means dependent upon depression of said pedal for energizing said solenoid, and means operable by fluid under pressure for de-energizing said solenoid and for holding said brake-operating connections in applied position when brake applying movement of said pedal has been arrested.

10. In a braking system having a power controlling circuit, manually operable means for effecting energization of said circuit, braking connections directly connected with said means, a fluid motor connected with said connections, means operable upon energization of said circuit to conduct fluid pressure to said motor, and means separate from said last named means and operable by fluid pressure supplied said motor for interrupting said power controlling circuit and for holding the brakes applied when the braking connections have been actuated a desired amount.

WILFRED A. EATON.